United States Patent
Zhang

(10) Patent No.: US 9,316,470 B2
(45) Date of Patent: Apr. 19, 2016

(54) MEASURING DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Bing-Jun Zhang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 250 days.

(21) Appl. No.: 14/181,632

(22) Filed: Feb. 15, 2014

(65) Prior Publication Data

US 2014/0304998 A1    Oct. 16, 2014

(30) Foreign Application Priority Data

Apr. 10, 2013   (CN) .................. 2013 1 01221755

(51) Int. Cl.
  *G01B 5/14*   (2006.01)
  *G01B 3/00*   (2006.01)
  *G01B 5/02*   (2006.01)

(52) U.S. Cl.
  CPC *G01B 3/002* (2013.01); *G01B 5/02* (2013.01); *G01B 5/14* (2013.01)

(58) Field of Classification Search
  CPC .............. G01B 5/20; G01B 5/06; G01B 5/00; G01B 5/25; G01B 5/14
  USPC .............................. 33/520, 1 BB, 811, 501.06
  See application file for complete search history.

(56) References Cited

U.S. PATENT DOCUMENTS

| | | | | |
|---|---|---|---|---|
| 3,722,360 A * | 3/1973 | Blakey | .................. | B23Q 3/107 33/545 |
| 7,827,702 B1 * | 11/2010 | Zhang | ...................... | G01B 5/14 33/613 |
| 7,963,045 B2 * | 6/2011 | Zhang | ...................... | G01B 5/143 33/501.06 |
| 8,256,127 B1 * | 9/2012 | Zhang | ...................... | G01B 3/50 33/501.06 |
| 8,468,706 B2 * | 6/2013 | Zhang | .................... | G01B 5/143 33/1 BB |
| 8,904,662 B2 * | 12/2014 | Zhang | ...................... | G01B 5/25 33/533 |
| 9,212,884 B2 * | 12/2015 | Zhang | ...................... | G01B 3/38 |
| 2010/0293803 A1 * | 11/2010 | Zhang | ...................... | G01B 5/143 33/810 |
| 2012/0266476 A1 * | 10/2012 | Zhang | ..................... | G01B 5/004 33/558.01 |
| 2012/0266477 A1 * | 10/2012 | Zhang | ..................... | G01B 5/143 33/674 |
| 2013/0219731 A1 * | 8/2013 | Zhang | ..................... | G01B 21/24 33/550 |
| 2014/0290082 A1 * | 10/2014 | Zhang | ..................... | G01B 5/20 33/550 |
| 2014/0304998 A1 * | 10/2014 | Zhang | ..................... | G01B 3/002 33/545 |
| 2014/0310971 A1 * | 10/2014 | Zhang | ..................... | G01B 3/205 33/811 |

* cited by examiner

*Primary Examiner* — Yaritza Guadalupe-McCall
(74) *Attorney, Agent, or Firm* — Novak Druce Connolly Bove + Quigg LLP

(57) ABSTRACT

A measuring device for measuring and inspecting various linear dimensional properties of a machined groove in a workpiece includes a fixing base, a measuring assembly, and first and second positioning members received through and protruding from the fixing base at right angles during the movement of the measuring assembly. The measuring assembly includes a measuring member, a shim, and an elastic member, the shim sleeves on an end of the measuring member, and the elastic member resists between the shim and the fixing base. The measuring assembly, together with the first positioning member and the second positioning member, enable the required depth and relative position of the machined groove to be accurately determined and inspected.

20 Claims, 4 Drawing Sheets

MEASURING DEVICE

BACKGROUND

1. Technical Field

The present disclosure generally relates to measuring devices, and particularly to a measuring device for measuring and inspecting the distance or linear dimensional properties of a groove defined in a workpiece relative to a side wall of the workpiece to determine or assess whether the groove has been machined as desired.

2. Description of the Related Art

A groove with a bottom surface which is curved in three dimensions (3D), is usually defined in a workpiece for assembling with other structures. A side wall of the workpiece is positioned adjacent to the groove. A caliper is usually used to measure a depth of the groove and the distances between sidewalls of the groove and the side wall of the workpiece for measuring a position of the groove relative to the side wall to determine whether the groove has been machined as desired. However, the distance or linear measuring values may be inaccurate because the point of contact of the caliper to the 3D curved bottom surface of the groove may vary or be different in each measurement. A measuring device may include a fixing base and a measuring assembly positioned on the fixing base. A positioning surface fitting or matching to the 3D bottom surface of the groove is a bottom surface of the fixing base of the measuring device. The positioning surface of the fixing base of the measuring device resists against the 3D curved bottom surface of the groove during measuring. However, the measuring values greatly depend on a shape of the positioning surface of the fixing base. If a shape of the positioning surface is not exactly the same as a shape of the 3D curved bottom surface of the workpiece, a distance measuring value obtained is also inaccurate.

Therefore, there is room for improvement within the art.

BRIEF DESCRIPTION OF THE DRAWING

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
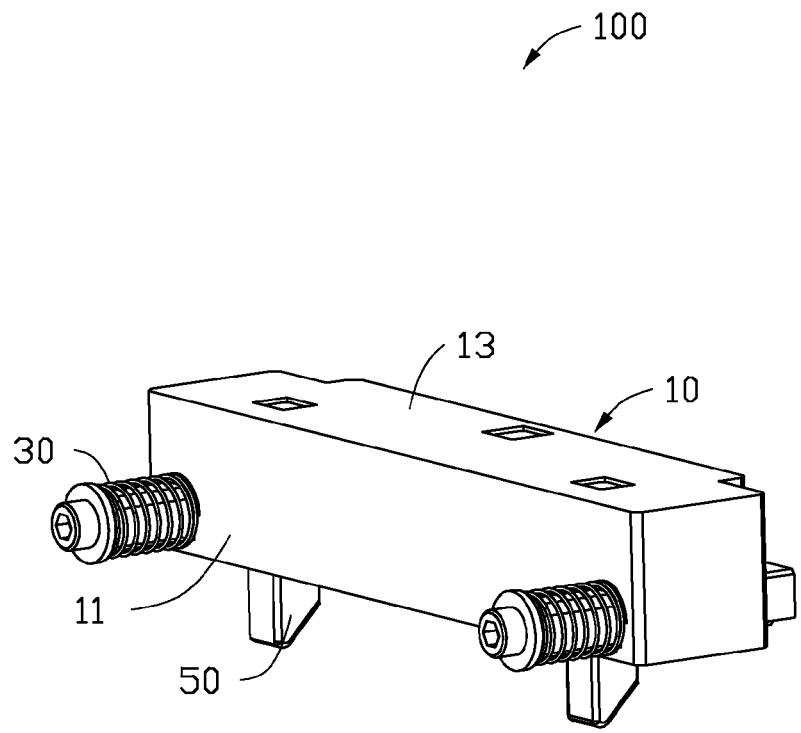
FIG. 1 shows an assembled, isometric view of an embodiment of a measuring device.
Figure 2:
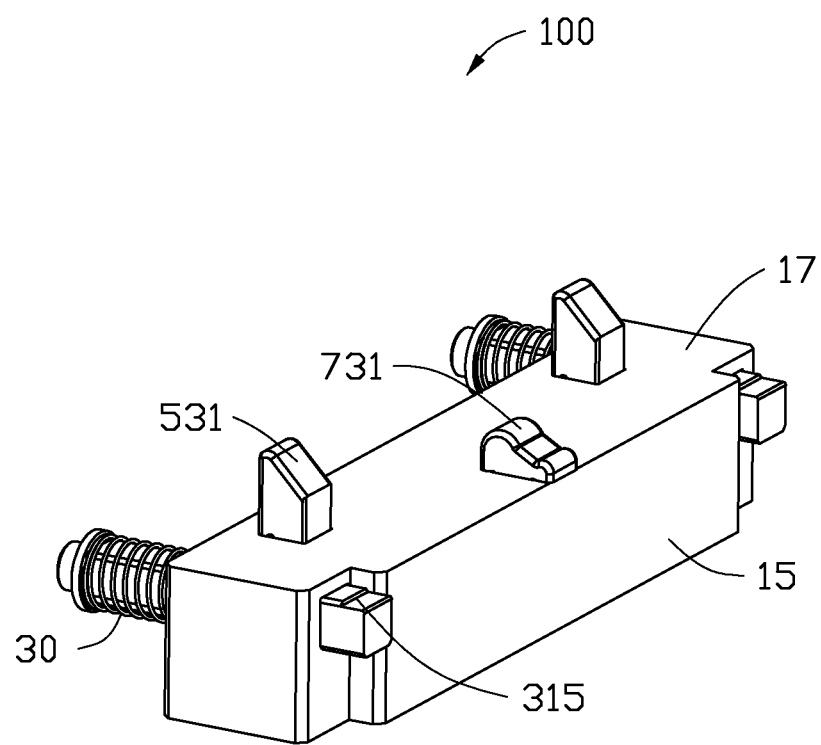
FIG. 2 is similar to FIG. 1, but viewed from another aspect.
Figure 3:
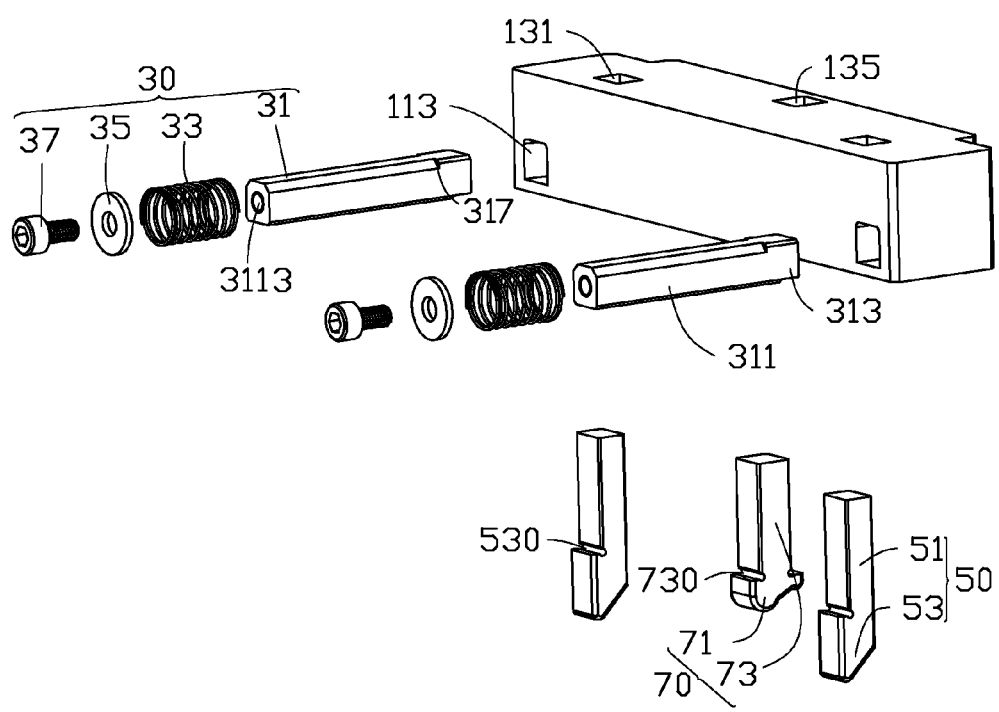
FIG. 3 shows an exploded, isometric view of the measuring device of FIG. 1.
Figure 4:
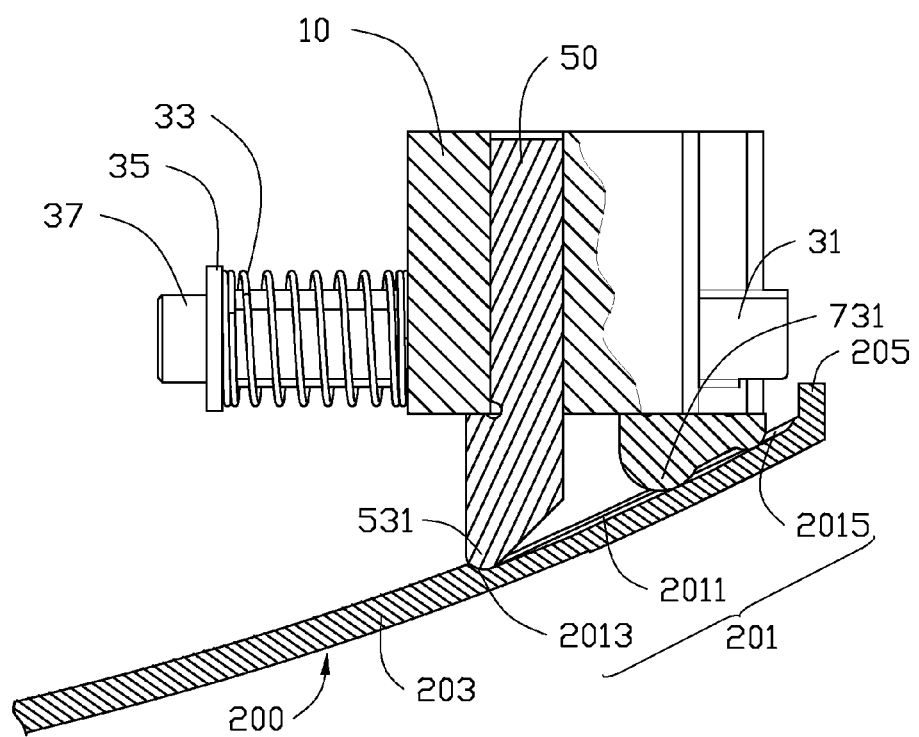
FIG. 4 shows a work state of the measuring device of FIG. 1.

FIGS. 1 to 4 show a measuring device 100 for measuring and inspecting various linear dimensional properties (relating to length, width, depth, etc.) of a groove 201 defined in a workpiece 200 relative to a side wall 205 of the workpiece 200, to determine whether the groove 201 has been machined as desired. In the illustrated embodiment, the workpiece 200 further includes a bottom wall 203 connected to the side wall 205. The groove 201 is formed in the bottom wall 203 and positioned adjacent to the side wall 205. The bottom wall 203 includes a bottom surface 2011, a first connecting surface 2013, and a second connecting surface 2015. The bottom surface 2011, the first connecting surface 2013, and the second connecting surface 2015 together define the groove 201. The bottom surface 2011 is a 3D (three dimensional) curved surface. The second connecting surface 2015 is located oppositely to the first connecting surface 2013, and the bottom surface 2011 connects the first connecting surface 2013 and the second connecting surface 2015. The second connecting surface 2015 is positioned adjacent to the side wall 205. The measuring device 100 includes a fixing base 10, two measuring assemblies 30, two first positioning members 50, and a second positioning member 70. The two measuring assemblies 30 are telescopically received through the fixing base 10 along a first direction in parallel. The first positioning members 50 and the second positioning member 70 are received through the fixing base 10 along a second direction substantially perpendicular to the first direction.

The fixing base 10 includes a first sidewall 11, a second sidewall 13, a third sidewall 15, and a fourth sidewall 17 connected in that order. The first sidewall 11 and the third sidewall 15 are substantially parallel, and the second sidewall 13 and the fourth sidewall 17 are substantially parallel and positioned between the first sidewall 11 and the third sidewall 15. Two through holes 113 are separately defined in the first sidewall 11 along the first direction. Two spaced first positioning holes 131 are defined in the second sidewall 13 along the second direction substantially perpendicular to the first direction, and are positioned adjacent to the first sidewall 11. A second positioning hole 135 is defined in the second sidewall 13 along the second direction substantially perpendicular to the first direction and positioned adjacent to the third sidewall 15.

Each measuring assembly 30 is telescopically received through one through hole 113. The measuring assembly 30 includes a measuring member 31, an elastic member 33, a shim 35, and a fastening member 37. The measuring member 31 includes a connecting portion 311 and a measuring portion 313 protruding from the connecting portion 311. The connecting portion 311 is received through the through hole 113. Two ends of the connecting portion 311 protrude from the fixing base 10. A locking hole 3113 is defined in an end surface of the connecting portion 311 away from the measuring portion 313. The measuring portion 313 abuts the second sidewall 13 of the fixing base 10. A size of the measuring portion 313 along the second direction is greater than that of the connecting portion 311. The measuring member 31 further includes a benchmark shoulder 315 and a stop shoulder 317. The benchmark shoulder 315 is formed in a bottom of the measuring portion 313 adjacent to the fourth sidewall 17. A height of the benchmark shoulder 315 is predetermined according to an allowable error (tolerance) range of the workpiece 200. The stop shoulder 317 is formed in the measuring portion 313 and located opposite to the benchmark shoulder 315 for preventing the measuring member 31 detaching from the fixing base 10. The elastic member 33 is sleeved around an end of the connecting portion 311 exposed from the first sidewall 11. The fastening member 37 passes through the shim 35 and is locked in the locking hole 3113. The elastic member 33 resists the first sidewall 11 and the shim 35, and is located between the first sidewall 11 and the shim 35. The shim 35 is located between the fastening member 37 and the connecting portion 311.

Each first positioning member 50 is mounted in one of the first positioning holes 131. Each first positioning member 50 includes a first mounting portion 51 and a first positioning portion 53 connected to the first mounting portion 51. The first mounting portion 51 is received through the first positioning hole 131. The first positioning portion 53 is positioned outside of the fixing base 10 and abuts the fourth sidewall 17. A width of the first positioning portion 53 is greater than a width of the first mounting portion 51. A first positioning shoulder 530 is formed at an end of the first positioning portion 53 adjacent to the first mounting portion 51, and resists against the fourth sidewall 17 of the fixing base 10. A first resisting end portion 531 is formed at one end of the first positioning portion 53 away from the first mounting portion 51, and is being positioned resisting against the bottom surface 2011 and the first connecting surface 2013 of the groove 201. In the illustrated embodiment, an end surface of the resisting end portion 531 away from the first mounting portion 51 is an arc-shaped surface. A shape of the end surface of the first resisting end portion 531 fits over the bottom surface 2011 and the first connecting surface 2013.

Each second positioning member 70 is detachably received through the second positioning hole 135. Each second positioning member 70 includes a second mounting portion 71 and a second positioning portion 73 connected to the second mounting portion 71. The second mounting portion 71 is received through the second positioning hole 135. The second positioning portion 73 is positioned outside of the fixing base 10 and abuts the fourth sidewall 17. The width of the second positioning portion 73 is greater than that of the second mounting portion 71. A second positioning shoulder 730 is formed in an end portion of the second positioning portion 73 adjacent to the second mounting portion 71, and resists against the fourth sidewall 17. A second resisting end portion 731 is formed in one end of the second positioning portion 73 away from the second mounting portion 71 and when being positioned, to be resisting against the bottom surface 2011 and the second connecting surface 2015 of the groove 201. In the illustrated embodiment, an end surface of the second resisting end portion 731 away from the second mounting portion 71 is a curved surface. The second resisting end portion 731 includes two arc-shaped curved surface segments and a flat surface segment interconnecting the two arc-shaped curved surface segments. A number of the arc-shaped curved surfaces of the second resisting end portion 731 is not limited to two, and there may be one, or three, or more for multi-point contacts in an alternative embodiment.

In assembly, the connecting portion 311 of the measuring member 31 is inserted the through hole 113, the elastic member 33 is sleeved on the connecting portion 311, and the fastening member 37 passes through the shim 35 and is locked in the locking hole 3113, such that one measuring assembly 30 is assembled to the fixing base 10. Another measuring assembly 30 is assembled to the fixing base 10 in similar fashion. The two first positioning members 50 are respectively mounted in the two first positioning holes 131. The second positioning member 70 is mounted in the second positioning hole 135.

In use, the first resisting end portion 531 resists against the bottom surface 2011 and the first connecting surface 2013, the second resisting end portion 731 resists against the bottom surface 2011, and the measuring portion 313 is positioned towards the side wall 205. A gap exists between the measuring portion 313 and the side wall 205. The measuring member 31 is forced to move along the through hole 113. When the benchmark shoulder 315 attaches to the side wall 205 or a bottom of the measuring portion 313 attaches to a top of the side wall 205, then the position of the groove 201 in the workpiece 200 relative to the side wall 205 can be deemed to have been machined as desired or that of desired or adequate machining quality. When a bottom of the benchmark shoulder 315 is above the top of the side wall 205; in other words, when a gap is formed between the bottom of the benchmark shoulder 315 and the top of the side wall 205, then the position of the groove 201 is deemed to be too close relative to the side wall 205, and the groove 201 can be deemed unsatisfactory. It means that the position of the groove 201 is out of place or too far away relative to the side wall 205, when a front surface of the measuring portion 313 away from the connecting portion 311 resists against the side wall 205.

As described above, the first resisting end portion 531 resists against the first connecting surface 2013 and the bottom surface 2011 of the groove 201, and the second resisting end portion 731 resists against the bottom surface 2011, thereby the measuring device 100 contacts the bottom surface 2011 and the groove 201 at multiple points. As a result, the profile surface processing requirements of the first resisting end portions 531, and the second resisting end portions 731 contacting with the bottom surface 2011 are lowered. In addition, operation of the measuring device 100 is simpler and quicker.

In other embodiments, a number of the first positioning member 50 and the second positioning member 70 is at least one. The positions and lengths of the first positioning member 50 and the second positioning member 70 are positioned as required. The elastic member 33, the shim 35, and the fastening member 37 of the measuring assembly 30 can be omitted, and the measuring member 31 is movably received through the through hole 113. The benchmark shoulder 315 may be deleted, and the position of the groove 201 in the workpiece 200 relative to the side wall 205 can be deemed to have been machined as desired, when the bottom of the measuring portion 313 attaches to the top of the side wall 205.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A measuring device for inspecting dimensional properties of a machined groove in a workpiece relative to a side wall of the workpiece, the workpiece further comprises a bottom wall connected with the side wall, the groove is defined in the bottom wall and cooperative defined by a curved bottom surface in three dimensions, a first connecting surface, and a second connecting surface, the second connecting surface is located oppositely to the first connecting surface and connected to the first connecting surface via the bottom surface, the second connecting surface abuts the side wall of the workpiece, and the measuring device comprising:

a fixing base, a measuring member movably assembled to the fixing base along a first direction;

a first positioning member and a second positioning member received through and protruding from the fixing base at as same side of the fixing base along a second direction substantially perpendicular to the first direction, the first positioning member being spaced from the second positioning member, wherein the first positioning member resists against the bottom surface and the first connecting surface, and the second positioning member resists against the bottom surface, when the measuring member is forced to move along a first direction until a bottom of the measuring member attaches to a top of side wall, the position of the groove relative to the side wall of the workpiece has thereby deemed to be of desired machining quality.

2. The measuring device of claim 1, wherein the first positioning member comprises a first mounting portion and a first positioning portion connected to the first mounting portion, the first mounting portion passes through the fixing base, the first positioning portion is positioned outside of the fixing base, and a first resisting end portion is formed in the first positioning portion away from the first mounting portion for resisting against the bottom surface and the first connecting surface.

3. The measuring device of claim 2, wherein an end surface of the first resisting end portion is an arc-shaped curved surface.

4. The measuring device of claim 2, wherein a width of the first positioning portion is greater than the width of the first mounting portion, a first positioning shoulder is formed in an end of the first positioning portion adjacent to the first mounting portion, and the first positioning shoulder resists against the fixing base.

5. The measuring device of claim 1, wherein the second positioning member comprises a second mounting portion and a second positioning portion connected to the second mounting portion, the second mounting portion passes through the fixing base, the second positioning portion is positioned outside of the fixing base, and a second resisting end portion is formed in the second positioning portion away from the second mounting portion for resisting against the bottom surface.

6. The measuring device of claim 5, wherein an end surface of the second resisting end portion away from the second mounting portion is a curved-shaped surface.

7. The measuring device of claim 5, wherein an end surface of the second resisting end portion is a curved surface for fitting over the bottom surface.

8. The measuring device of claim 7, wherein the end surface of the second resisting end portion comprises two arc-shaped curved surface segments and a flat surface segment interconnected between the two arc-shaped curved surface segments.

9. The measuring device of claim 8, wherein a width of the second positioning portion is greater than the width of the second mounting portion, and a second positioning shoulder is formed in an end of the second positioning portion adjacent to the second mounting portion to resist against the fixing base.

10. The measuring device of claim 1, wherein the measuring member comprises a connecting portion and a measuring portion protruding from the connecting portion, the connecting portion received through and protrudes from the fixing base, and the measuring portion is exposed out of the fixing base.

11. The measuring device of claim 10, wherein the measuring member further comprises a benchmark shoulder formed in a bottom of the measuring portion for attaching to the top of the side wall.

12. The measuring device of claim 10, wherein the measuring member further comprises a stop shoulder formed in the measuring portion for preventing the measuring member detaching from the fixing base.

13. The measuring device of claim 12, wherein the measuring device further comprises an elastic member and a shim, the shim is sleeved around the connecting portion and positioned outside of the fixing base, and the elastic member sleeved on the connecting portion and resisting between the shim and the fixing base.

14. A measuring device for measuring and inspecting dimensional properties of a machined groove in a workpiece, the measuring device comprising:
a fixing base,
a measuring assembly telescopically received through the fixing base along a first direction, wherein the measuring assembly comprises a measuring member, a shim, and an elastic member, the measuring member movably passes through the fixing base, two ends of the measuring member protrude from the fixing base, the shim sleeves on an end of the measuring member, and the elastic member resists between the shim and the fixing base; and
a first positioning member and a second positioning member received through and protruding from the fixing base during moving of the measuring assembly, the first positioning member spaced from the second positioning member, wherein the measuring assembly together with the first positioning member and the second positioning member, enable the required depth and relative position of the machined groove to be accurately determined.

15. The measuring device of claim 14, wherein the first positioning member comprises a first mounting portion and a first positioning portion connected to the first mounting portion, the first mounting portion passes through the fixing base, the first positioning portion is positioned outside of the fixing base, a first resisting end portion is formed in the first positioning portion away from the first mounting portion, and an end surface of the first resisting end portion is a curved surface.

16. The measuring device of claim 15, wherein a width of the first positioning portion is greater than of the width of the first mounting portion, and a first positioning shoulder is formed in an end of the first positioning portion adjacent to the first mounting portion to resist against the fixing base.

17. The measuring device of claim 14, wherein the second positioning member comprises a second mounting portion and a second positioning portion connected to the second mounting portion, the second mounting portion passes through the fixing base, the second positioning portion is positioned outside of the fixing base, a second resisting end portion is formed in the second positioning portion away from the second mounting portion.

18. The measuring device of claim 17, wherein an end surface of the second resisting end portion away from the second mounting portion is a curved-shaped surface.

19. The measuring device of claim 18, wherein the end surface of the second resisting end portion comprises two arc-shaped curved surface segments and a flat surface segment interconnected between the two arc-shaped curved surface segments.

20. The measuring device of claim 18, wherein a width of the second positioning portion is greater than the width of the second mounting portion, and a second positioning shoulder is formed in an end of the second positioning portion adjacent to the second mounting portion to resist against the fixing base.

* * * * *